Jan. 9, 1940.　　　　F. D. WELCH　　　　2,186,511
WALLBOARD
Filed Sept. 23, 1937　　　3 Sheets-Sheet 1
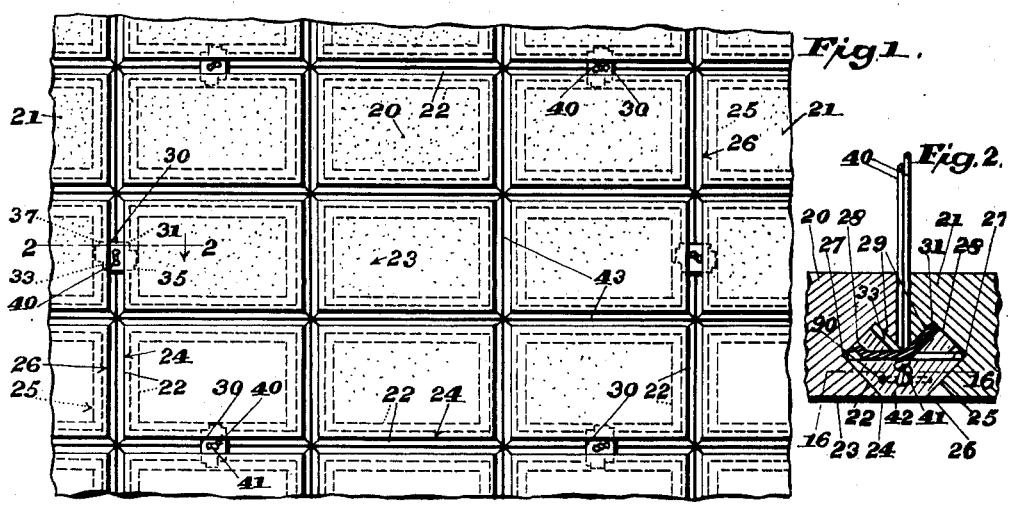
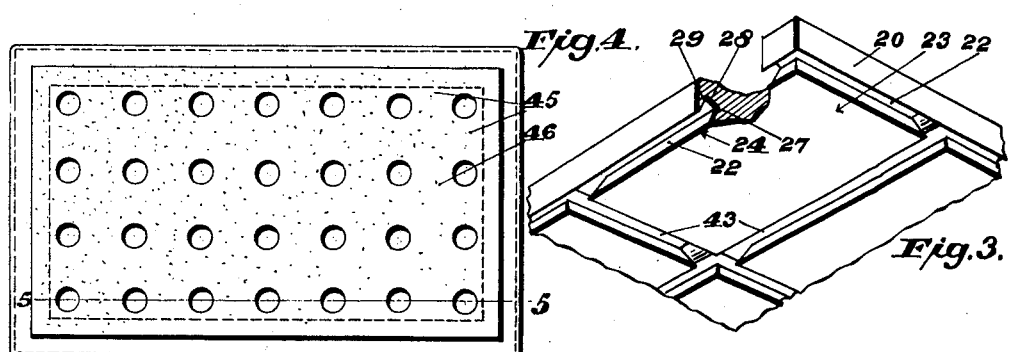
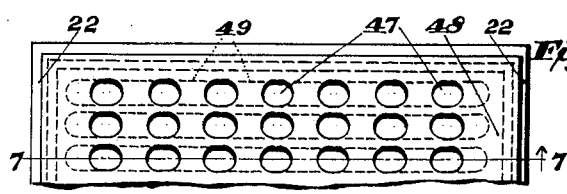
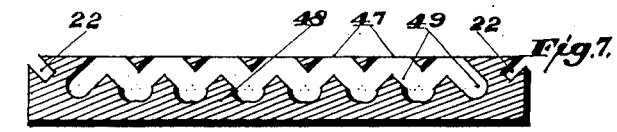
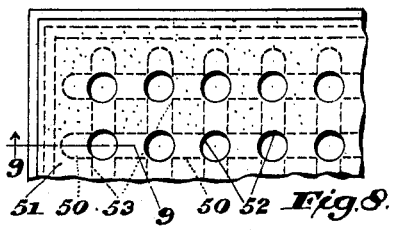
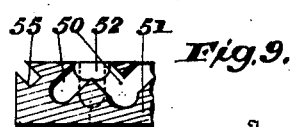
Inventor
Floyd D. Welch
By Munn, Anderson & Liddy
Attorney Jan. 9, 1940.     F. D. WELCH     2,186,511
WALLBOARD
Filed Sept. 23, 1937     3 Sheets-Sheet 2
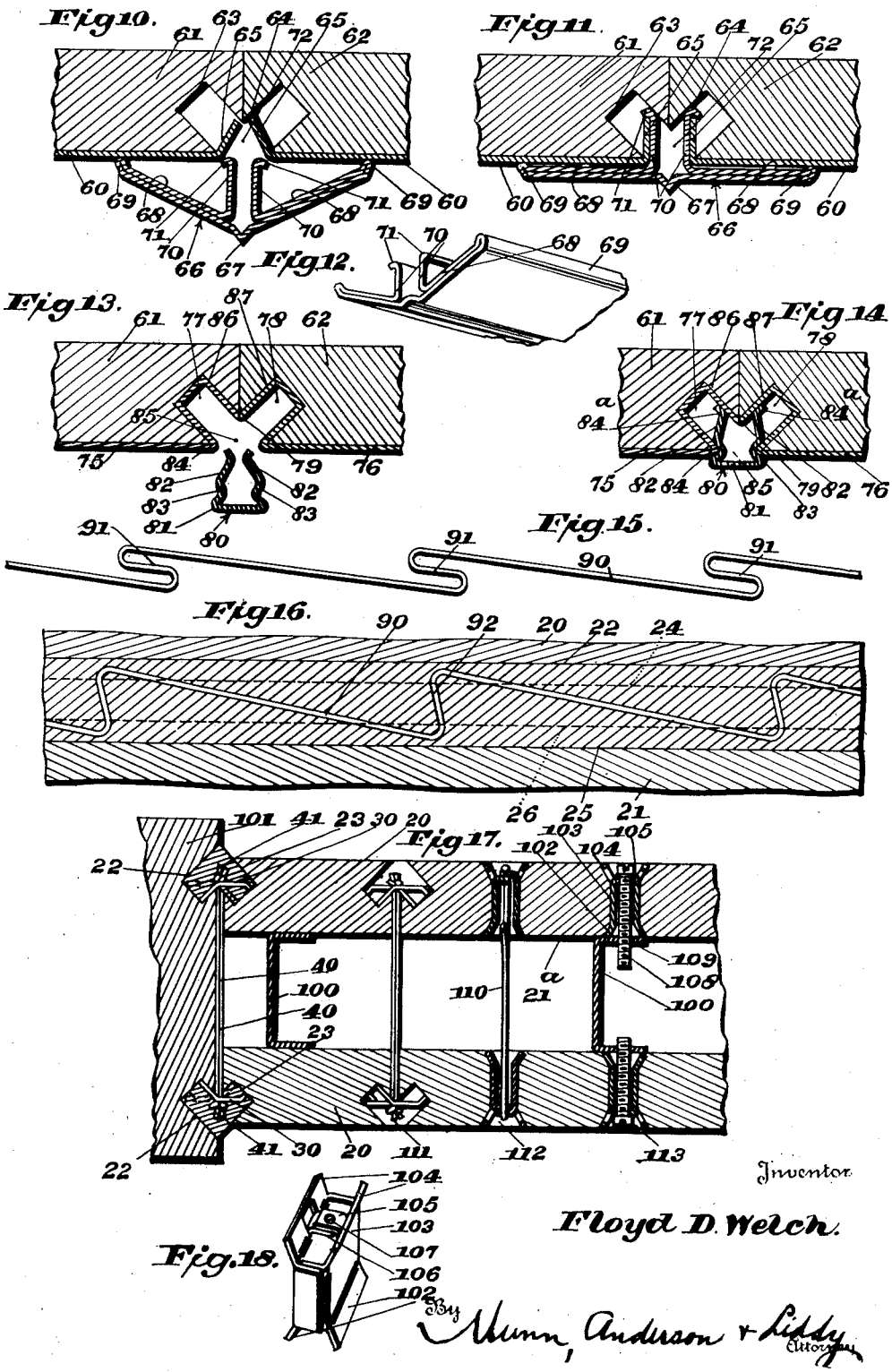
Inventor
Floyd D. Welch.

Jan. 9, 1940.                F. D. WELCH                2,186,511
                              WALLBOARD
                      Filed Sept. 23, 1937           3 Sheets-Sheet 3
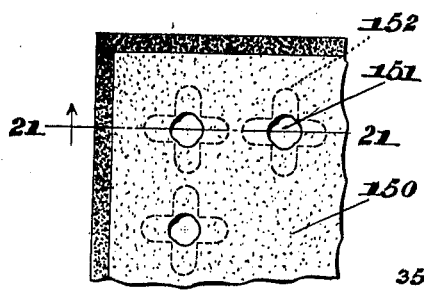
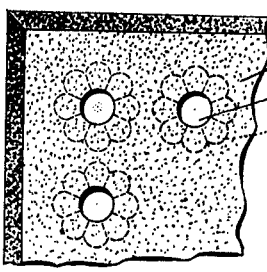
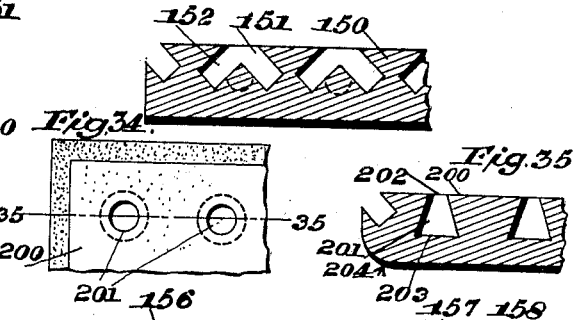
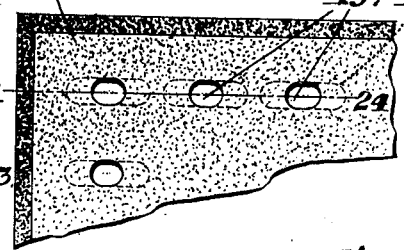
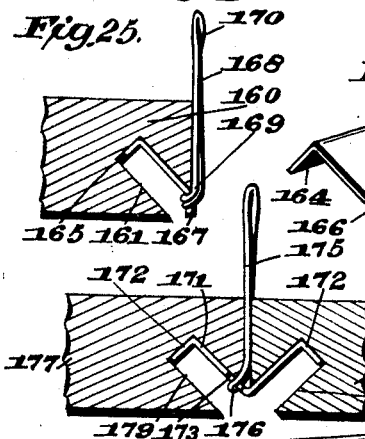
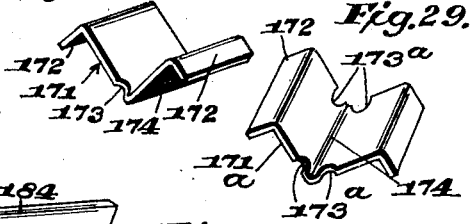
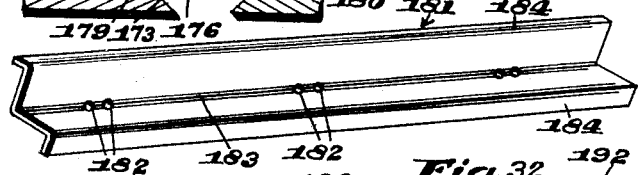
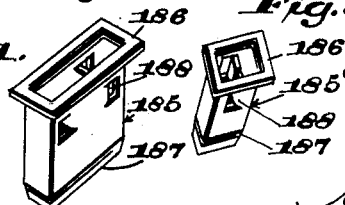
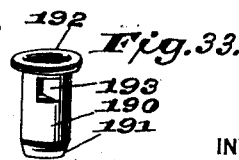
WITNESSES
INVENTOR
Floyd D. Welch
BY
Munn, Anderson & Liddy
ATTORNEY Patented Jan. 9, 1940

2,186,511

UNITED STATES PATENT OFFICE 2,186,511

WALLBOARD

Floyd D. Welch, Shreveport, La.

Application September 23, 1937, Serial No. 165,395

5 Claims. (Cl. 20—4)

This invention relates to wallboards, and is more particularly directed to a means for securing the edges of the wallboards together while providing for acoustical properties in the boards.

An object of the invention is the provision of a device for connecting grooved edges of wallboards together to not only provide a neat finish at the joint edges but to provide hollow spaces for giving to the boards at the joints acoustical properties.

Another object of the invention is the provision of a simple and efficient device for connecting the adjacent edges of wallboards together in which facing plates are employed upon the outer surface of the boards with the ends of the facing plates being turned into longitudinal grooves in the edges of the board, a closure for the space provided by the grooves to form a neat surface at the adjacent edges of the board and having in combination with the flanges on the facing plate cooperative locking means for not only rigidly connecting the edges of the boards together but for maintaining the closures in position.

A further object of the invention is the provision of a wallboard having a plurality of pockets of various configurations in connection with grooves which are inclined at an angle to the outer faces of the boards to provide soundproof qualities in said boards, means being employed for rigidly connecting the edges of the boards together and for covering the joined edges of the boards.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a plan view of a section of a wall showing my invention applied to a plurality of wallboards, Figure 2 is a vertical section taken along the line 2—2 of Figure 1, Figure 3 is a view in perspective of a portion of the wallboard partly in section, Figure 4 is a plan view of a section of a wallboard showing conically-shaped holes formed therein, Figure 5 is a vertical section taken along the line 5—5 of Figure 4, Figure 6 is a fragmentary plan view of a modified form of the wallboard in which the cylindrical pockets are disposed at angles to each other and having a common elongated opening, Figure 7 is a vertical section taken along the line 7—7 of Figure 6, Figure 8 is a fragmentary plan view of another form of the pockets in which the pockets are inclined and provided with a common opening, Figure 9 is a vertical section taken along the line 9—9 of Figure 8, Figure 10 is a vertical section showing one form of the connecting means and closure for the joint ends of the adjacent edges of wallboards with the connecting means in an inoperative position, Figure 11 is a similar section showing the combined closure and connecting means in operative position, Figure 12 is a view in perspective of the combined closure and connecting means in detached relation, Figure 13 is a vertical section of a modified form of a closure and connecting means in an inoperative position, Figure 14 is a similar section to that shown in Figure 13 with the combined connecting and closure means in an operative position, Figure 15 is a longitudinal side view of a reinforcing means at the connected portions of the wallboards before the same has been applied, Figure 16 is a horizontal section taken along the line 16—16 of Figure 2 showing the reinforcement in position, Figure 17 is a horizontal section of a side wall showing a modified form of connecting means for wallboards, Figure 18 is a view in perspective of an element of the connectors shown in Figure 17, Figure 19 is a view in perspective of the connecting means shown in Figure 21, Figure 20 is a fragmentary plan view of a board showing another modified form of the acoustical chambers, Figure 21 is a vertical section taken along the line 21—21 of Figure 20, Figure 22 is a further modified form of the chambers, Figure 23 is a plan view of a board showing a still further modified form of the chambers, Figure 24 is a vertical section taken along the line 24—24 of Figure 23, Figure 25 is a fragmentary vertical section showing another form of the means for securing the edges of the board to a wall, Figure 26 is a view in perspective of a metal plate used in Figure 25, Figure 27 is a fragmentary vertical section showing another modified form of the metal plate for securing the edges of the boards to a wall.

Figure 28 is a view in perspective of the metal plate shown in Figure 27,

Figure 29 is a view in perspective of a plate similar to Figure 28 but disclosing a slight modification, Figure 30 is a view in perspective of another form of the securing means disclosing a metallic strip, Figure 31 is a view in perspective of a metal insert for securing intermediate portions of the board to the wall, Figure 32 is a view in perspective of a metal insert showing a modified form of that disclosed in Figure 31, Figure 33 is a view in perspective of a still further modified form of the inserts shown in Figs. 31 and 32, and Figure 34 is a fragmentary plan view of another modified form of the board, and Figure 35 is a vertical section taken along the line 35—35 of Figure 34.

Referring more particularly to the drawings, 20 and 21 generally designate a pair of panels which have their meeting edges in close contact. The wallboard 20 along its edges is provided with a longitudinal groove 22 which is inclined at an acute angle to the outer surface 23 of the board. This groove is formed through the lower edge so that as shown at 24 this edge is cut away to provide a partial opening from the outer face 23 of the board into the inclined groove 22. The board 21 has a similarly disposed inclined groove 25 and this groove also opens through the outer face as shown at 26, thereby providing a space or elongated opening in the meeting edges of the panels or boards at the outer surface of the said boards. These inclined longitudinal grooves therefore have an angular portion as shown at 27, a bottom wall 28 and inclined side walls 29.

Connecting means for securing the wallboards to the studs of a building are located in spaced relation within the longitudinal grooves 22 and 25. The connecting means, shown more particularly in Fig. 19, consists of a flat plate 30 having a finger 31 cut from the body of the metal and extended upwardly at an angle so that the portion 32 is located at the center of the plate 30. The second finger 33 is also cut from the plate 30 and is bent upwardly so that the portion 34 will be substantially in a line with the portion 32. The plate is further provided with a finger 35 bent upwardly from the extension 36 of said plate while a finger 37 is cut from the extension 38 and likewise bent upwardly. The plate per se between the bent-up portions 31 and 33 is provided with an opening 39 to receive the ends of a plurality of wires 40.

When the keeper or securing means 30 is located within the longitudinal grooves 22 and 25 it will be seen that the members 31 and 33 will engage the inclined faces 29 of the longitudinal grooves and thus will draw the meeting edges of the panels in close contact. The fingers 36 will engage the bottom 28 of the groove 25 while the faces 37 will engage the bottom 28 of the groove 22. The edges of the extensions 36 and 38 will respectively be seated within the angular portions 27 of the grooves 25 and 22.

The wires 40 are twisted to form an enlargement 41 at the outer face of the plate 30 so that when the wires 40 are drawn up tight the boards 20 and 21 will not only be rigidly secured to the studs of a building but the various extensions and fingers on the plate 30 will cooperate with complementarily formed surfaces in the grooves 22 and 25 for not only bringing the meeting edges of the plates in close contact but for maintaining said edges in position.

After the panels are in place the open space between the edges 24 and 26 of the respective grooves 22 and 25 will be filled with cementitious material as shown at 42 in Fig. 2. Thus it will be seen that the securing means are embedded in the material and out of sight so that the boards where they are connected together will have a smooth continuous surface.

The parts or sections 43 of the panels are similar in shape to the connected meeting edges and are known as "dummy" sections.

In Figs. 4 and 5 is shown a panel provided with a plurality of conically-shaped pockets 45 and these pockets may have any arrangement and extend inwardly from the outer surface through the body of the board 46 and these pockets are for the purpose of damping sound waves. It will be noted, however, that the longitudinal edges of the panels or boards 46 are also provided with the cooperating inclined grooves 22 and 25.

In Figs. 6 and 7 it will be seen that a plurality of elliptical openings 47 appear in the outer faces of the board 48 and these openings will form the ends of a plurality of spaced inclined pockets 49. These pockets are formed when the plaster board is molded or they may be bored into the board. From an inspection of Fig. 6 it will be seen that while the pockets are located at an acute angle to each other a pair of pockets have common openings and these openings extend in longitudinal series with the pockets projecting in opposite direction from the openings.

Referring more particularly to Figs. 8 and 9 it will be seen that inclined pockets 50 are also provided in a board 51 and these pockets have a common opening as shown at 52. The openings in this case, however, are circular. The arrangement in this construction is such that a pair of pockets 50 extend in opposite directions from the common opening 52 while pairs of pockets 53 likewise extend in opposite directions from the common opening 52 but are located in a plane which is at right angles to the plane passing through the pockets 50. It will be seen by this construction that a greater soundproof quality is provided due to the greater number of spaces or concavities within the panels. The panels shown in Figs. 8 and 9 are likewise provided with inclined passages 55 which are similar in all respects to the passages 22 and 25 shown in Figs. 1 to 7, inclusive.

Referring more particularly to Figs. 10 to 12, inclusive, it will be seen that a modified form of the arrangement for connecting the meeting edges of the panels together is provided and this arrangement includes facing plates 60 on the outer surfaces of the boards 61 and 62.

The meeting edges of the boards are provided with longitudinal grooves 63 and 64 and a flange 65 at the edge of the plates is formed by bending the edges of these plates inwardly into the grooves 63 and 64. These flanges extend along the length of the edges of the plates and when the plates are in position these flanges will be within the said pockets with the inner ends closer together than their outer ends.

A covering plate, generally designated by the numeral 66, is adapted to be applied to the openings between the flanged ends of the facing plate 60 to engage the opening but to leave a hollow space which has been formed by the grooves 63 and 64. This covering plate consists of an elongated strip of metal which is bent upon itself as shown at 67 to provide intermediate its edges as shown at 67 to provide a rib for decorative purposes. The plate is bent upon itself as shown at 68 to form an overlap at opposite sides of the rib at 67. As shown at 69 the overlapped portions are bent inwardly to provide feet to engage the facing plate 60. The inner free ends of the overlapped portions 68 and longitudinal flanges 70 have hooks 71 at the free ends to engage over the free edges of the flanges 65 when the flanges 70 are forced through the space 72 between the meeting edges of the panels 61 and 62.

As shown in Fig. 11, the hooks 71 engage over the free edges of the flanges 65 while the main body of the connecting member is forced into flat engagement with the outer faces of the plates 60. By this means a rigid construction is provided for not only securing the ends of the boards 61 and 62 together but for locking them in place.

In Figs. 13 and 14 is shown a modified form of the device disclosed in Figs. 10 to 12, inclusive. In this instance the facing plates 75 and 75 are so bent that the side walls of the grooves 77 and 76 are lined with the material of the facing plates 75 and 76 and the free ends of the plates, as shown at 79, are in abutting relation.

The U-shaped clip, generally designed by the numeral 80, is provided with a base member 81 and a pair of legs 82. These legs are crimped, as shown at 83, to receive the angular portion 84 which forms an edge at the open space 85 between the panels 61 and 62. The outer ends of the legs are bent towards each other and then crimped, as shown at 84ª. The free bent edges of the legs engage the inclined side walls 86 and 87 of the channel members formed on the edges of the face plates 75 and 76, as shown more particularly in Fig. 14.

Referring to Figs. 15 and 16, it will be seen that I have provided a metal reinforcing member, generally designated by the numeral 90 which is bent at spaced points to form convolutions 91. The member 90 is placed within the pocket formed by the longitudinal grooves 22 and 25, as shown in Fig. 2, and outwardly of the plate 30 so that when the cement 42 has become hardened this reinforcing member will be imbedded in the cement.

When the member 90 is located within the groove or space between the meeting edges it is attached at one end to a fixed point while the other end is drawn until the convolutions assume the shape at 92.

Fig. 17 shows a horizontal section of the side wall in which U-shaped metal studs 100 are employed instead of the usual wooden studs and the wallboards or panels 20 are connected together by means of the construction shown in Figs. 1 and 2 and the side edges of the wallboards are also connected to the door jamb 101 by means of the plates 30 and the wires 40. Furthermore, the door jamb 101 is provided with an inclined groove 22 while an inclined groove 25 is formed in the mold board 20. When the wires 40 are drawn up tight and are twisted to form heads, as shown at 41, the wallboards 20 will be rigidly secured to the door jamb and a similar construction is applied between the meeting edges of the wallboards or panels 20 and 21.

A further securing means is shown in Figs. 17 and 18 in which a piece of metal has been cut and bent to form a rectangular member which has flanged edges 102 which extend out to the rear surface 21ª of the panels. The opposite end of the connecting member 103 has outwardly flared flanges 104 and from these flanges are cut overlapping lips 105 and 106. These flanges may be perforated, as shown at 107, and a bolt 108 passes through the aligned perforations 107 and is threaded into a passage 109 in a leg of the U-shaped member 100. In this case the flanges 102 engage the legs of the U-shaped stud.

Instead of the threaded bolts 108 being employed a wire 110 is used for tying the members 103 together by bringing the wire over the top of the overlapped lips 105 and 106 and the ends of the wire may be connected together in any approved manner as desired. The wire, however, may be sufficiently rigid so that when it is placed in the position shown in Fig. 17 the wire will remain in position. The spaces 111, 112 and 113 may be filled with a suitable cement to cover up the openings and this cement may be the usual finishing plaster employed for the purpose.

Referring more particularly to Figures 20 and 21 it will be seen that the board is provided with a plurality of openings 151 arranged in predetermined series at the outer face of the board with pockets 152 radiating inwardly from the openings 151 with the pockets arranged in groups wherein the longitudinal axis of each pocket will be disposed in planes which are at right angles to the axis of adjacent pockets. The pockets 152 not only meet at the common opening 151 but these pockets overlap at the opening as shown in Figure 21.

Referring more particularly to Figure 22 it will be seen that the board 153 has a plurality of openings 154 at its outer face with a plurality of pockets 155 arranged around the opening and extending inwardly and the outer ends of the pockets not only meet at the common opening 154 but the outer side edges of the pocket open into adjacent pockets, thereby creating a larger air chamber at each opening than will be found in the other forms.

In Figure 23 a board 156 also has a plurality of openings 157 in the outer surface with diametrically disposed pockets 158 leading inwardly from the common opening 157. In this type of construction the chambers of course are much more restricted than those shown in Figs. 20 to 22, inclusive. In Figure 25 a board 160 is provided with inclined grooves 161 at its edges and in these grooves are mounted metal plates 162 at intervals along the grooves.

Each plate consists of a base portion 163 having an inturned flange 164 at one end which rests upon the bottom 165. The opposite end of the base member 163 is provided with a downwardly turned flange 165 which is provided with notches 166 at its ends. It will be noted that the outer edge 167 of the flange 165 falls short of the outer surface of the board 160 or the same may be flush with the outer surface.

A looped wire 168 has a portion 169 engaging around the flange 165 and nested within the notches 166. The extreme inner end 170 of the wire 168 is secured in any approved manner to a fixed part of the wall of a building. When the wire is fixed in place the board 160 will be drawn up tight against the scantling of the wall.

The inturned flange 165 which is disposed at approximately right angles to the base portion 163 is jammed in the inner end of the groove 161 and therefore is held against displacement when the wire 168 is secured in position.

Referring more particularly to Figures 27 and 28 it will be seen that a modified form of a metal plate is had and this metal plate, generally designated by the numeral 171, is V-shaped in cross section and has inturned flanges 172 and notches 173 adjacent the apex 174 of the plate.

A wire 175 similar to that shown in Fig. 25 has a portion 176 looped around the plate and seated within the notches 173. This wire is then placed between the abutting edges of the boards 177 and 178 after the two portions of the V-shaped flange are seated within the longitudinal grooves 179 and 180. At this time the flanges 172 are seated at the bottom of the grooves 179 and 180.

Referring more particularly to Figure 29 it will be seen that a metal strip 171a similar in all respects to the plate 171, except that the notches 173a are formed in the side walls of the V-shaped plate upon opposite sides of the apex 174, is provided.

Referring more particularly to Figure 30 it will be seen that a metal strip, which is V-shaped in cross section and which is similar in construction to that shown in Figs. 28 and 29, is provided in which a metal strip 181 is provided with a series of spaced perforations 182 along the portion 183. These perforations are adapted to receive the looped end of a wire and this wire is fixed to the wall of a building in a manner described in connection with the looped wires 168 and 175. The metal strip is provided with inturned flanges 184 which are adapted to be seated in the bottom of the longitudinal grooves in the edges of the boards.

In Figure 31 is disclosed a metal insert 185 which is rectangular in cross section and hollow and this metal insert is to be driven in through the board until an external flange 186 is imbedded in the outer surface of the board. The inner edge of the insert, as shown at 187, is sharpened to facilitate penetration. The side walls of the metal insert are punctured to provide lugs 188 upon which is adapted to be engaged a fastening member which may be in the shape of a strip of wire and this is done in a manner similar to that shown in Fig. 17.

In Fig. 32 is shown a metal insert 185a which is identical in construction with that shown in Fig. 31 except that this metal insert is square in cross section instead of being rectangular. The same reference numerals, however, are applied to both devices shown in Figs. 31 and 32.

In Fig. 33 is shown a cylindrical insert 190 which has a sharpened inner end 191. This facilitates penetration of the board while the outer end is provided with a flange 192 which is adapted to be imbedded in the outer surface of the board when the insert is driven into position. This insert is also provided with lugs 193 which project inwardly into the interior of the insert sufficiently to support the ends of a wire for drawing the boards up tight intermediate its edges as has been explained in connection with Fig. 17.

In Figs. 34 and 35 is shown a further modification in which a wall board 200 has a plurality of pockets 201 spaced at intervals with openings 202 and a bottom 203. The pocket is in the shape of a frustum of a cone with the wide base portion 203 located within the board while the smaller end forms the opening 202.

These pockets may be bored with a spiral under-reaming bit or they may be formed during the molding of the board.

This type of pocket gives approximately the same results as those pockets shown in Figs. 20 to 22, inclusive.

The edges of the boards may be rounded as shown at 204 in Fig. 35 when the boards are applied flat against another surface.

I claim:

1. A wallboard having a plurality of air chambers having an opening at the outer face of the wallboard, each chamber including a plurality of pockets extending inwardly from the opening, and having substantially the same cross sectional area throughout the lengths thereof.

2. A wallboard having a plurality of air chambers having an opening at the outer face of the wallboard, each chamber including a plurality of inclined and radially disposed pockets extending inwardly from the opening, and having the same cross sectional area throughout the length thereof, said chambers providing a soundproof board.

3. A wallboard having a plurality of air chambers having an opening at the outer face of the wallboard, each chamber including a plurality of pockets extending inwardly from the opening, certain pockets of one chamber having the inner ends thereof in open communication with the closely associated ends of pockets of adjacently disposed chambers, said pockets having the same cross sectional area throughout their length, the air chambers providing a soundproof board.

4. A wallboard having a plurality of openings at the outer face of said board and a plurality of pockets having the same cross sectional area throughout the length thereof grouped around each opening and leading to said opening to form a plurality of air chambers, said chambers providing a soundproof board.

5. In the combination of a plurality of wallboards arranged edge to edge, each board having a plurality of openings at one face thereof and a plurality of inclined air chambers leading to each opening, certain of the chambers of one board opening into the chambers of adjacent boards, all of the chambers cooperating to provide soundproof qualities in the board, said chambers extending inwardly and at an angle to each other in groups from the openings in the face of the board and having the same cross sectional areas throughout the depth thereof.

FLOYD D. WELCH